United States Patent Office 3,346,510
Patented Oct. 10, 1967

3,346,510
CATALYST COMPOSITIONS AND PROCESS FOR PREPARATION THEREOF
John H. Sinfelt, Berkeley Heights, William F. Taylor, Scotch Plains, and George W. Dembinski, Chatham, N.J., assignors to Esso Research and Engineering Company, a corporation of Delaware
No drawing. Filed July 26, 1965, Ser. No. 474,996
11 Claims. (Cl. 252—455)

The present invention concerns improved hydrocarbon conversion catalyst compositions and methods for the preparation thereof. In particular, the present invention relates to improved bifunctional catalysts containing a hydrogenation-dehydrogenation component and an acidic component, said catalyst composition being distinguished by the fact that said two components are held in relatively close physical proximity to each other but in such manner that chemical interaction between the two components is prevented.

The catalyst compositions of the present invention exhibit greater dehydrogenation activity and greater total acidic activity than the bifunctional catalysts previously known to the art. Additionally, the catalyst compositions of the present invention show a high selectivity towards the formation of commercially desirable products in the hydrocarbon conversion processes in which they are employed.

Cracking of hydrocarbons in the presence of hydrogen is a well-known petroleum refinery operation and many catalysts have been used or suggested for this purpose. In general, it finds its highest degree of utility in cracking hydrocarbons boiling in the range of heavy naphtha and gas oils, though it also may be used for upgrading, by conversion to gas oil and gasoline, such feeds as heavy gas oils and even higher boiling feedstocks. In general, hydrocracking may be applied to virgin and catalytic naphthas, gas oils, cycle oils and stocks from conventional cracking operations boiling generally in the gas oil range, and alkyl aromatic hydrocarbons in general, as well as straight run heavy virgin naphthas and gas oils.

The hydrocarbon cracking process itself consists of passing the feedstock in admixture with hydrogen over the catalyst if a fixed bed of catalyst is used, or in contact with a moving bed or a fluidized solids bed of catalyst at suitable temperatures, feed rates, pressures, etc., to effect a substantial conversion of the feedstock to lower boiling materials, e.g., gasoline. Simultaneously, organic nitrogen and sulfur components present in the feed are largely converted to ammonia and hydrogen sulfide, respectively. The reaction conditions are to a considerable extent governed by the nature of the feed, the activity of the catalyst, and the nature of the desired end product.

The early prior art catalysts that have been employed in this process have not been completely satisfactory for a number of reasons. Some catalysts have been found to be particularly sensitive to the presence of feed impurities, in particular to organic nitrogen. Such catalysts include the oxides, sulfides and reduced forms of iron group metals. These catalysts require frequent regeneration, or maintenance of reaction conditions not conducive to high yields of desirable products. Other catalysts such as noble metals supported on conventional amorphous cracking catalysts such as silica-alumina, silica-magnesia, silica-alumina-magnesia and the like, had not shown as high an activity as is desirable, and often require regeneration more often than desirable. Many catalysts also have high coke-forming tendencies, and also require relatively high pressures, which is expensive, as well as the requirement of feed purification to achieve desired activity levels.

Recently, some improvements in bifunctional catalyst performance in hydrocarbon conversion processes have been obtained by utilizing as a component in the catalyst composition crystalline metallic alumino-silicates having uniform pore openings of between 6–15 Angstroms. These alumino-silicates have been given the designation of "molecular sieves" for their ability to selectively adsorb molecules of hydrocarbons having critical cross sectional molecular areas while excluding all larger hydrocarbons. For example, U.S. 2,971,903 described crystalline metallic alumino-silicates which contain a member of the alkaline earth, platinum or iron groups, or chromium. The metal may be introduced into the crystalline alumino-silicate by ion exchange followed by reduction of the metal to its active form as in British Patent No. 941,349; or the metal component may be impregnated onto the molecular sieve as in French Patent No. 1,320,007. Other methods suggested by the art for introducing metals into molecular sieves include treating the dehydrated molecular sieve with the vapor of the desired metal as in Belgian Patent No. 581,953 or alternatively utilizing a decomposable compound of the metal in question, which compound is adsorbed into the interstices of the sieve and decomposed therein, as in U.S. Patent No. 3,013,988.

It has now been found, and as such forms the basis of the present invention, that bifunctional catalysts comprising a hydrogenation-dehydrogenation metal component and an acidic component having reactive sites of varying degrees of activity thereon, can be substantially improved in hydrocarbon conversion performance both as to selectivity and activity, by maintaining the metal component independent of the strongly acidic sites of the acidic component so as to prevent interaction between them. It will be shown herein that if the metal component is placed directly on the strongly acidic sites of the acid component either by impregnation or cation exchange that the said metal will interact preferentially with said strongly acidic sites thereby reducing the activity of both components. That is to say, that if the metal component is allowed to interact with the strongly acidic sites of the acidic component then the total hydrogenation-dehydrogenation activity and the total acidic activity of the bifunctional catalyst are both diminished.

In a preferred embodiment of the present invention, the desired separation between the hydrogenation-dehydrogenation metal component and the strongly acid sites of the acidic component of the bifunctional catalyst is obtained by first treating the component containing the strongly acidic sites with a basic compound which will react reversibly and preferentially with said strongly acidic sites. The base treated component may then be contacted with the hydrogenation-dehydrogenation component by any of the methods known to the art, such as wet impregnation, base exchange, etc., and the said hydrogenation-dehydrogenation component will interact selectively with the less acidic sites on the base treated acidic component. Finally, the strongly acidic sites can be reactivated by removal of the base compound either as a separate step or in conjunction with the activation procedure for the hydrogenation-dehydrogenation metal component, e.g., during the reduction of said metal component from its oxide, sulfide or other high oxidation state to its metallic state.

Compounds which may be used as the acidic components of the present catalyst compositions consist of acidic refractory oxides such as silica-alumina or halogen treated alumina, the aluminum halides and the alumino-silicate crystalline zeolites, either natural or synthetic, known to the art as "molecular sieves." The choice of which acidic component to use will of course depend upon the nature of the hydrocarbon conversion process contemplated, as the activity of each of said materials in particular hydrocarbon conversion processes has been well established in the art.

Crystalline alumino-silicate zeolites that have molecular sieve properties are now well known in the art. While the molecular sieve zeolites differ from each other in chemical composition, they may generally be characterized as alkali metal or alkaline earth metal, hydrated alumino-silicates. Their crystal patterns are such that they present structures containing a large number of pores having an exceptional uniformity of size. The pores in different zeolites may vary in diameter from less than 4 Angstroms to 15 Angstroms or more; but for any one of these zeolites, the pores are essentially of uniform size. Because of this, such zeolites are popularly known as molecular sieves.

Molecular sieve zeolites that have pore openings in the range of about 6 to 15 Angstroms can be employed as catalysts or catalyst bases for various processes, particularly hydrocarbon conversion processes, because the pore sizes are such that they allow for easy ingress of hydrocarbon reactants and egress of the reaction products.

The crystalline molecular sieve zeolites have chemical formulas whose anhydrous form may be expressed in terms of moles by the following:

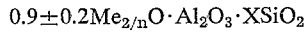

$$0.9 \pm 0.2 Me_{2/n}O \cdot Al_2O_3 \cdot XSiO_2$$

In the above formula, Me is selected from the group consisting of metal cations and hydrogen, the metal cations being selected from the group consisting of cobalt, nickel, zinc, magnesium, calcium, cadmium, copper, barium and the rare earth metals. Ordinarily, the sieve as found in nature or prepared synthetically, will contain sodium as the metal cation. It is desirable to exchange the major portion of this sodium, i.e., to a final sodium concentration of less than 10 percent, by utilizing base-exchange processes well known in the art.

The subscript $n$ is the valance of Me, and X is a number in the range from about 2 to about 14. Most useful are those zeolites in which X is in the range from about 3 to about 6.5. Preferred molecular sieve zeolites for use in hydrocarbon conversion processes such as hydrocracking, hydroisomerization, hydrodenitrogenation, hydrodesulphurization, etc., are represented by synthetic faujasites or 13Y molecular sieves which have been cation exchanged to yield the hydrogen or magnesium form. Other preferred molecular sieve zeolites are the 13X type, cation exchanged to yield the hydrogen, magnesium or rare earth element form.

The hydrogenation-dehydrogenation component utilized in the present invention comprises metals either in the elemental form or as the respective sulphides, oxides or other compounds decomposable to the elemental form of Group VIII metals in the Periodic Table as well as metals in any of the above forms of Groups V–B, VI–B and VII–B or mixtures thereof. The preferred metals for use in this component are members of the platinum family, e.g., platinum, palladium and nickel.

The bases which may be utilized to reversibly react with strong acid sites of the acidic component may be a Lewis type base, preferably a nitrogen containing compound. Examples of suitable nitrogen compounds include the primary, secondary and tertiary alkyl amines, the aryl amines, the alkaryl amines, the arylalkylamines, the cycloalkylamines and ammonia. Non-nitrogen containing bases may also be employed in the practice of the present invention as for example the substituted phosphorous compounds, e.g., phosphines. However, the nitrogen compounds are preferred.

Specific nitrogen compounds usable in the base treatment process of the present invention include ammonia, methylamine, dimethylamine, ethylamine, diethylamine, the propylamines (including the iso compounds), the butylamines (including the iso and tertiary compounds), benzylamine, aniline, pyridine, quinoline, etc. Ammonia is an especially preferred compound due to its ease of handling, cheapness and reactive properties.

The amount of base utilized can be in the range of $1 \times 10^{-8}$ to $1 \times 10^{-6}$ g.-equivalents of base per square meter of surface of the acidic material; and preferably in the range of 0.5 to $3 \times 10^{-7}$ g.-equivalents of base per square meter of surface of acidic material. The most preferred base is ammonia which in a preferred embodiment is used in the gaseous phase to neutralize the strongly acidic sites. Ammonia can be desorbed from the acidic component with facility by treating at elevated temperatures, i.e., 100 to 1200° F. at atmospheric or reduced pressures for 0.5 to 10 hours, which thermal treatment results in the desorption of the ammonia thereby restoring the original strongly acid sites. As indicated previously, the removal of the basic compound can be done as a separate step or can be done simultaneously with the activation of the hydrogenation-dehydrogenation component.

The above embodiment of the present invention can be more easily understood by reference to the following examples.

*Example 1*

A 100 gram sample of silica-alumina (87% $SiO_2$, 13% $Al_2O_3$) was dried for 4 hours at 220° F. and then was exposed to an ammonia vapor (0.08 gram of $NH_3$) at room temperature for 1 hour. This neutralized material was impregnated with a sufficient quantity of a saturated aqueous solution of a nitro amino-platinum complex to ensure a 0.6 weight percent concentration of platinum metal in the finished catalyst, dried at 220° F. for 1 hour, and was subsequently reduced with hydrogen at 850° F.

*Example 2*

The catalyst composition prepared by the method of Example 1 was tested for catalytic activity at hydrocracking conditions on a n-heptane feedstream. For comparison sake, an identical catalyst composition was prepared with the exception that the platinum component was impregnated directly onto the silica-alumina component without the ammonia pretreatment. The result of this comparison test is given in Table I.

TABLE I.—COMPARISON OF CATALYTIC ACTIVITIES

[Test conditions: 850° F.; 200 p.s.i.g.; $H_2$/n-heptane=5 (mole); 20 w./h./w.; feed—normal heptane]

| Catalyst | Total Conversion, Percent | Yield, wt. percent | | | | |
|---|---|---|---|---|---|---|
| | | $C_1+C_2$ | $C_3+C_4$ | $C_5+C_6$ | 2- and 3- methyl hexane | Aromatics, $C_6H_6+C_7H_8$ |
| 0.6 wt. percent Pt on $NH_3$-treated $SiO_2 \cdot Al_2O_3$ | 54.0 | 0.2 | 21.4 | 4.7 | 22.0 | 6.7 |
| 0.6 wt. percent Pt on $SiO_2 \cdot Al_2O_3$ | 46.8 | 0.2 | 21.6 | 2.4 | 18.0 | 4.7 |

As indicated in Table I, the catalyst prepared by the technique of the present invention proves to be approximately 15 per cent more active overall than the conventional platinum on silica-alumina catalyst (54.0 vs. 46.8 percent total conversion). In particular, the catalyst of the present invention was shown to be about 40% more active for the aromatization reaction and 20% more active for the isomerization reaction. This indicates a higher activity at both the hydrogenation-dehydrogenation and acidic sites on the catalyst.

As an additional embodiment of the present invention, it has been found that improved bifunctional catalysts can be prepared by utilizing a hydrogenation-dehydrogenation metal impregnated on a nonacidic component physically mixed with separate particles comprising the acidic component. In this manner, it is also possible to prevent the undesired interaction between the hydrogenation-dehydrogenation metal and the strongly acidic sites of the acidic component.

The catalyst composition of this second embodiment of the instant invention can be prepared by mixing together separate particles, one of which contains the hydrogenation-dehydrogenation active component preferably on a comparatively non-acidic support material, and the other an acidic component thereby forming a mixed catalyst in which the properties of the total catalyst are greatly superior to that which is obtained by indiscriminately introducing both components on the same particle, for example, by impregnating an untreated acidic support directly with the hydrogenation-dehydrogenation metal component.

The preparation of the mixed bifunctional catalyst of the above embodiment involves placing the hydrogenation-dehydrogenation metal on a non-acidic support material by means known to the art, e.g., by wet impregnation from an aqueous solution of a soluble form of the metal component. The hydrogenation-dehydrogenation component used in this embodiment is selected from the group utilized in the single particle embodiment of the present invention, which have been describd prviously. The support material for the dehydrogenation-hydrogenation metal component may be selected from relatively non-acidic refractory oxides such as alumina, silica, desurfaced silica-alumina, titania, zirconia and thoria. A particularly preferred support material is alumina. Generally, it is desirable to have a total of 1.5 to 15 wt. percent of the hydrogenation-dehydrogenation metal on the support material. A most preferred range is 1.5 to 5 wt. percent.

The bifunctional catalyst is obtained by simply mixing the supported hydrogenation-dehydrogenation component with the acidic component selected from the group previously described for the single particle embodiment. It is preferred that both components be in the form of fine powders (about 48 to 325 Tyler mesh) to ensure close physical proximity of the two components in the final composition. After mixing, the bifunctional catalyst composition can be formed into any desired shape, e.g., by pelleting. It has been unexpectedly found that the ratio of the two components forming the mixed bifunctional catalyst must be within a critical range in order to obtain desirbale hydrocarbon conversion activity. This ratio is not proportional to the amount of hydrogenation-dehydrogenation metal component present in the mixture as would be generally expected. In particular, the ratio of acidic components to hydrogenation-dehydrogenation components should be greater than about 2 and less than about 99 to 1, preferably in the range between about 4 to about 19 to 1 and most preferably in the range between about 4 and 9 to 1.

The criticality of the ratio of the acidic component to hydrogenation-dehydrogenation component in mixed bifunctional catalysts becomes readily apparent by examination of Table II wherein it is seen that if the ratio of acidic component to dehydrogenation component is less than 2.3/1 or greater than 19/1, then a very substantial drop in hydrocracking activity is obtained.

TABLE II

| Ratio of acidic component to dehydrogenation component [1]: | Hydrocracking activity [2] |
|---|---|
| 0 | 3 |
| 1 | 16 |
| 2.3 | 23 |
| 4 | 26 |
| 9 | 29 |
| 19 | 22 |
| 99 | 11 |

[1] Ratio on a weight basis for mixtures of 0.6% Pt on $Al_2O_3$ and silica-alumina.
[2] Hydrocracking activity expressed as percent yield to propane plus butanes when reacting n-heptane and hydrogen at 850° F., 200 p.s.i.g., 20 w./hr./w. and $H_2$/n-$C_7$ mole ratio of 5/1.

*Example 3*

The importance of preventing interaction between the hydrogenation-dehydrogenation function and the strongly acidic sites of the acidic function of a bifunctional catalyst is clearly shown by the following experiments.

In the first experiment a comparison was made between the dehydrogenation activity of a platinum catalyst impregnated on an non-acidic alumina support and the same amount of platinum impregnated on an acidic silica-alumina support. The results are shown in Table III.

TABLE III

| | Dehydrogenation activity [1] |
|---|---|
| 0.6 wt. percent Pt on nonacidic $Al_2O_3$ | 19 |
| 0.6 wt. percent Pt on acidic silica-alumina | 2 |

[1] Dehydrogenation activity expressed as percent conversion of cyclohexane to benzene at 600° F., 1 atm., 100 w./hr./w. and $H_2$/HC ratio of 4/1.

It is evident from Table III that direct impregnation of the platinum catalyst onto an untreated acidic support material will substantially reduce the dehydrogenation activity of the platinum catalyst.

An additional experiment was conducted to test the overall hydrocracking activity of platinum impregnated on a non-acidic alumina hydrogenation-dehydrogenation component mixed with a silica-alumina acidic component in the ratio of 9 parts silica-alumina to 1 part Pt/$Al_2O_3$. The comparison catalyst in this experiment was platinum impregnated directly on acidic silica-alumina. The total platinum content in both compositions was 0.6% based on the total catalyst. The results of the experiment are given in Table IV.

TABLE IV

| | Hydrocracking activity of total mixture [1] |
|---|---|
| Mixture containing 0.6% Pt overall (by a 9:1 mixture of silica-alumina and 6% Pt on non-acidic $Al_2O_3$ | 70 |
| Catalyst with 0.6% Pt impregnated directly on acidic silica-alumina | 43 |

[1] Activity as percent total conversion of n-heptane at 860° F., 200 p.s.i.g., 20 w./hr./w. and a $H_2$/n-$C_7$ mole ratio of 5/1.

It is evident from Table IV that the overall hydrocracking activity of the mixed catalyst is very substantially greater than a catalyst containing the same amount of platinum but impregnated directly on an acidic support medium.

*Example 4*

Mixed bifunctional catalyst compositions were prepared containing platinum impregnated on nonacidic alumina as the hydrogenation-dehydrogenation component and the hydrogen form of faujasite, a synthetic 13 Angstrom zeolite material of the Y type as the acidic component. The hydrocracking activity of the mixed bifunctional catalyst was compared to the activity of a catalyst prepared by impregnating platinum directly on the hydrogen faujasite zeolite. In all cases, the supports were impregnated with an aqueous solution of chloroplatinic acid to yield a constant total platinum level. The catalyst mixtures were prepared by physically mixing the platinum/alumina and H-faujasite both in the form of fine powders (about 100 mesh), followed by pelleting the mixed powders into ⅛-inch cylinders. The platinum/alumina component was prepared using eta alumina as the support and was calcined in air at 1100° F. for one hour after impregnation. The hydrogen faujasite was prepared from a synthetic 13 Y ammonium faujasite by heating the ammonium faujasite slowly in moist air while maintaining the temperature below 300° F. for the first three hours. All catalyst compositions were then reduced in hydrogen at 850° F. prior to the catalytic test, which reduction treatment resulted in converting the ammonium faujasite to the hydrogen form.

In Table V, data on the conversion of n-heptane at 200 p.s.i.g. are presented for a mixture containing 21 percent of 2 percent platinum on alumina and 79 percent of the hydrogen form of faujasite on the one hand, and on the other for a catalyst containing the same total amount of platinum (0.42%) directly impregnated on the hydrogen faujasite.

The data clearly indicate that the mixed catalyst is much more active for hydrocracking n-heptane to $C_3$ and $C_4$ than is the hydrogen faujasite catalyst directly impregnated with platinum. Furthermore, the activity maintenance of the mixed catalyst is much better, leveling out at about 60 percent of initial activity compared to about 21 percent of initial activity in the case of the directly impregnated catalyst.

In Table VI similar data are shown for a mixture containing 5 percent of 2 percent platinum on alumina mixed with 95 percent of hydrogen faujasite (0.1% platinum overall) and for a directly impregnated platinum on hydrogen faujasite catalyst also containing 0.1 percent platinum overall. In this example, the data were obtained at 850 p.s.i.g., which more closely corresponds to commercial hydrocracking conditions. Again, the mixed catalyst shows much higher activity and activity maintenance for hydrocracking n-heptane to $C_3+C_4$.

At the conditions shown in Table VI, the H-faujasite alone gives an initial hydrocracking conversion of 15.6 percent compared to about 2 percent for the alumina alone. Thus, the higher activity of the $Pt/Al_2O_3$+faujasite mixture as compared to the platinum on faujasite catalyst cannot be explained on the basis of replacing some of the faujasite by a more active cracking component. The overall mixture effect is therefore unexpected.

TABLE V.—COMPARISON OF MIXED CATALYST ($Pt/Al_2O_3$+FAUJASITE) WITH Pt ON FAUJASITE FOR HYDROCRACKING n-HEPTANE

[Conditions: 850° F., 200 p.s.i.g., $H_2/nC_7$=5/1, w./h./w.=20]

Mixture of 21% of 2% Pt on $Al_2O_3$+79% Faujasite (0.42% Pt Overall)

| Time on Stream, Hr. | Percent Conversion To— | | | | | Total Conv., percent |
|---|---|---|---|---|---|---|
| | $C_1+C_2$ | $C_3+C_4$ | $C_5+C_6$ Sats. | Arom. | iso $C_7$ | |
| 0.25 | 0.2 | 52.8 | 5.7 | 2.9 | 4.6 | 66.3 |
| 1 | 0.1 | 20.9 | 3.1 | 2.7 | 8.7 | 35.4 |
| 3 | 0.1 | 25.6 | 3.2 | 1.7 | 11.3 | 41.9 |
| 5 | 0.1 | 22.3 | 3.1 | 1.7 | 12.7 | 39.8 |

Directly Impregnated Pt on Faujasite (0.42% Pt)

| Time on Stream, Hr. | Percent Conversion To— | | | | | Total Conv., percent |
|---|---|---|---|---|---|---|
| | $C_1+C_2$ | $C_3+C_4$ | $C_5+C_6$ Sats. | Arom. | iso $C_7$ | |
| 0.25 | 0.2 | 36.5 | 4.5 | 1.4 | 1.9 | 44.5 |
| 1 | 0.1 | 13.6 | 2.0 | 0.7 | 2.0 | 18.1 |
| 3 | 0.1 | 5.8 | 1.1 | 0.3 | 1.0 | 8.2 |
| 5 | 0.1 | 5.8 | 1.2 | 0.4 | 1.7 | 9.1 |

TABLE VI.—COMPARISON OF MIXED CATALYST ($Pt/Al_2O_3$+H-FAUJASITE) WITH Pt ON H-FAUJASITE FOR HYDROCRACKING n-HEPTANE

[Conditions: 850° F., 850 p.s.i.g., $H_2/nC_7$=5/1, w./h./w.=20]

Mixture of 5% of 2% Pt on $Al_2O_3$+95% H-Faujasite (0.10% Pt Overall)

| Time on Stream, Hr. | Percent Conversion To— | | | | | Total Conv., percent |
|---|---|---|---|---|---|---|
| | $C_1+C_2$ | $C_3+C_4$ | $C_5+C_6$ Sats. | Arom. | iso $C_7$ | |
| 0.25 | 0.9 | 59.8 | 6.1 | 0.8 | 0.8 | 68.4 |
| 3.5 | 0.8 | 68.3 | 5.7 | 0.8 | 1.6 | 76.5 |
| 4.0 | 0.8 | 68.2 | 5.7 | 0.2 | 1.3 | 76.1 |

Directly Impregnated Pt on H-Faujasite (0.10% Pt)

| Time on Stream, Hr. | Percent Conversion To— | | | | | Total Conv., percent |
|---|---|---|---|---|---|---|
| | $C_1+C_2$ | $C_3+C_4$ | $C_5+C_6$ Sats. | Arom. | iso $C_7$ | |
| 0.25 | 0.6 | 41.9 | 8.4 | 1.8 | 2.0 | 54.8 |
| 1.0 | 0.4 | 44.5 | 6.7 | 0.5 | 1.8 | 53.9 |
| 3.0 | 0.4 | 31.3 | 3.0 | 0.6 | 1.7 | 36.8 |
| 4.0 | 0.3 | 24.2 | 2.8 | 0.5 | 1.7 | 29.5 |

The foregoing thus demonstrates the discovery that improved bifunctional catalysts are obtained by preventing interactions between the hydrogenation-dehydrogenation function and the strongly acidic sites of the acidic function of said catalyst. It is, of course, recognized that the invention is not limited to the exact catalyst composition shown for illustrative purposes, but is intended to cover all substitutions, modifications, and equivalents within the scope of the following claims.

What is claimed is:

1. An improved bifunctional catalyst composition for hydrocarbon conversion processes comprising a hydrogenation-dehydrogenation component and an acidic component having reactive acidic sites of varying degrees of acidity thereon and selected from the group consisting of amorphous silica-alumina and the crystalline aluminasilicate zeolites having uniform pores in the range of 6 to 15 Angstroms wherein said components are maintained in close physical proximity to each other without concomitant chemical interaction between them said catalyst being prepared by first treating the acid component with a Lewis type base selected from the group consisting of the nitrogen containing bases and the phosphorus containing bases under conditions such that the said base selectively and reversibly interacts with the acidic sites having a greater degree of acidity, then compositing the hydrogenation-dehydrogenation component on the treated acidic component and reactivating the acidic sites by removing the basic compound from said acidic sites.

2. The catalyst composition of claim 1 wherein said acidic component is silica-alumina.

3. An improved bifunctional catalyst composition comprising an acidic crystalline alumino-silicate zeolite having uniform pores in the range of 6 to 15 Angstroms, which zeolite is characterized further by having reactive acid sites of varying degrees of acidity thereon, wherein a hydrogenation-dehydrogenation metal catalyst component is selectively associated with the reactive sites of lesser acidity of said zeolite while the reactive sites of greater acidity remain in a substantially unassociated condition said catalyst being prepared by first treating the alumino-silicate zeolite with a Lewis type base selected from the group consisting of the nitrogen containing bases and the phosphorus containing bases under conditions such that the said base selectively and reversibly interacts with the acidic sites having a greater degree of acidity, then compositing the hydrogenation-dehydrogen component on the treated acidic component and reactivating the acidic sites by removing the basic compound from said acidic sites.

4. The catalyst composition of claim 3 wherein said zeolite is a synthetic faujasite in the hydrogen form.

5. The catalyst composition of claim 3 wherein said zeolite is a synthetic faujasite in the magnesium form.

6. An improved method for the preparation of bifunctional catalyst compositions containing a hydrogenation-dehydrogenation component composited with an acidic-component selected from the group consisting of amorphous silica-alumina and the crystalline alumina-silicate zeolites having uniform pores in the range of 6 to 15 Angstroms having reactive sites of varying degrees of acidity thereon, comprising the following steps:
 (a) treating the acidic component with a basic compound characterized by its ability to selectively and reversibly interact with reactive sites on said acidic component having a greater degree of acidity;
 (b) compositing the said treated acidic component with the said hydrogenation-dehydrogenation component so as to selectively deposit said hydrogenation-dehygenation component at reactive sites having a lesser degree of acidity on said acidic component; and
 (c) removing said basic compound from said highly acidic reactive sites.

7. The method of claim 6 wherein the said acidic-component is an acidic crystalline alumino-silicate zeolite having a uniform pore size in the range between 6 to 15 Angstroms, said hydrogenation-dehydrogenation component is a metal selected from the class consisting of the Group VB, VIB, VIIB and VIII metals of the Periodic Table and said basic compound comprises ammonia.

8. The method of claim 6 wherein the said acidic component is acidic silica-alumina, said hydrogenation-dehydrogenation component is a metal selected from the class consisting of the Group VB, VIB, VIIB and VIII metals of the Periodic Table and said basic compound comprises ammonia.

9. The improved catalyst composition of claim 1 obtained when the said Lewis type base is ammonia.

10. The improved catalyst composition of claim 2 obtained when the said Lewis type base is ammonia.

11. The improved catalyst composition of claim 3 obtained when the said Lewis type base is ammonia.

References Cited

UNITED STATES PATENTS

| | | | |
|---|---|---|---|
| 2,962,435 | 11/1960 | Fleck et al. | 208—119 |
| 3,140,251 | 7/1964 | Plank et al. | 208—120 |
| 3,140,253 | 7/1964 | Plank et al. | 208—120 |

DELBERT E. GANTZ, *Primary Examiner.*

ABRAHAM RIMENS, *Examiner.*